Figure 1:
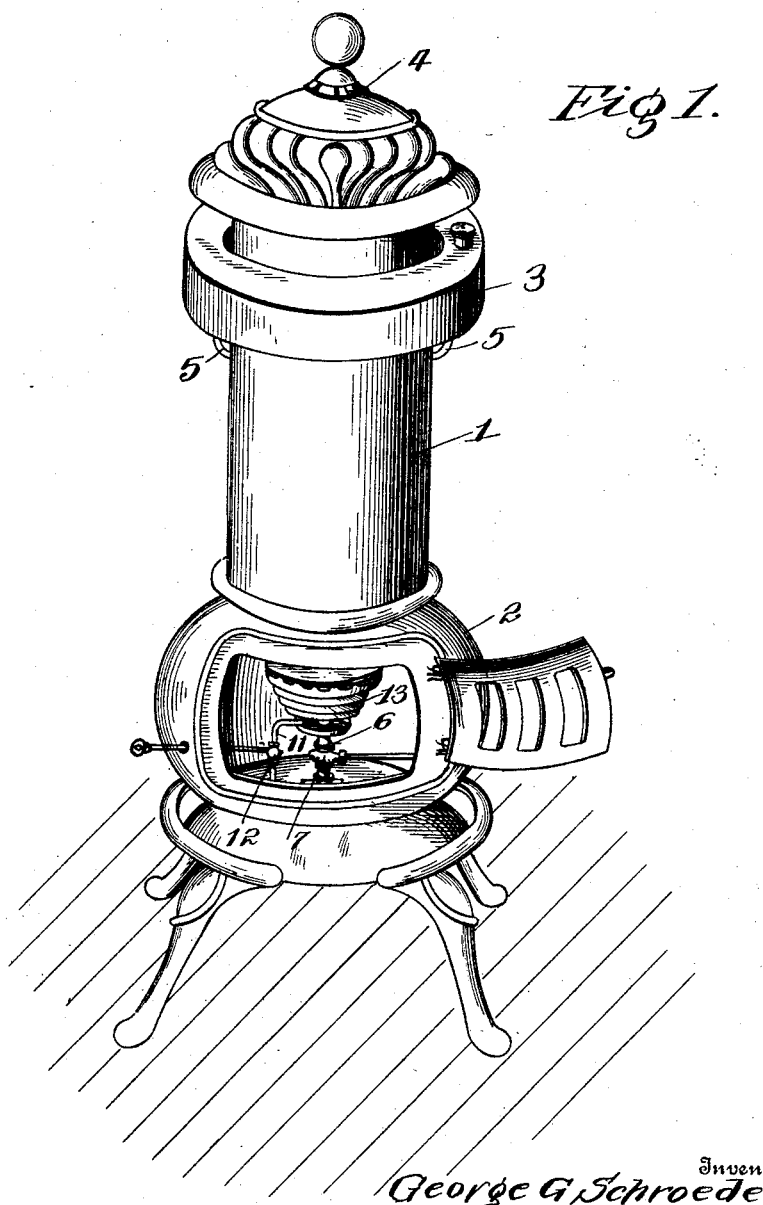

No. 866,604. PATENTED SEPT. 17, 1907.
G. G. SCHROEDER.
DENATURED ALCOHOL HEATER.
APPLICATION FILED NOV. 12, 1906.

3 SHEETS—SHEET 1.

Witnesses
Berli Braun
F. Siebschutz

Inventor
George G. Schroeder
By
Wm. D. Hodges
Attorney

No. 866,604.

PATENTED SEPT. 17, 1907.

G. G. SCHROEDER.
DENATURED ALCOHOL HEATER.
APPLICATION FILED NOV. 12, 1906.

3 SHEETS—SHEET 3.

Inventor
George G. Schroeder

Witnesses
Berthe Braun
F. Liebschutz

By Wm. D. Hodges
Attorney

UNITED STATES PATENT OFFICE.

GEORGE G. SCHROEDER, OF WASHINGTON, DISTRICT OF COLUMBIA, ASSIGNOR TO INDUSTRIAL ALCOHOL HEAT AND LIGHT COMPANY, A CORPORATION OF SOUTH DAKOTA.

DENATURED-ALCOHOL HEATER.

No. 866,604.        Specification of Letters Patent.        Patented Sept. 17, 1907.

Application filed November 12, 1906. Serial No. 343,050.

*To all whom it may concern:*

Be it known that I, GEORGE G. SCHROEDER, a citizen of the United States, residing at Washington, in the District of Columbia, have invented certain new and useful Improvements in Denatured-Alcohol Heaters, of which the following is a specification.

This invention has relation to denatured alcohol heaters, and it consists in the novel construction and arrangement of its parts as hereinafter shown and described.

The object of the invention is to provide an individual detached heater of the character as indicated; one that may be readily moved from place to place without disconnecting couplings or other fuel feeding means. At the same time the heater is of simple construction and is of such dimensions as to take up but little room when in operation.

The heater consists primarily of a drum mounted upon a base, with a fuel reservoir surrounding the upper portion of the drum. Fuel supply pipes connect at their upper ends with the said reservoir and pass into the drum and down along the inner sides of the same and connect with the fuel burner which is located in the base. Suitable valves being interposed between the supply tank and the heater, as will be hereinafter explained.

The burner is of special construction, and is especially adapted for heating purposes and for converting the liquid fuel into gas and mixing the same with air before the resultant mixture is consumed. It consists of a pan into which the liquid is first introduced through a reduced pipe from one of the supply pipes for the purpose of starting the burner or heating the same to the desired temperature in order that the main burner may automatically generate the gas and produce the mixture as before stated. The supply pipes connect with a vertically arranged cylinder which is provided with a series of spray perforations arranged in horizontal circular rows. A casing surrounds the said cylinder, and is composed of a series of meniscus sections joined together at their edges, said sections increasing in diameter from the lower to the upper. The rows of spray perforations in the said cylinder are arranged at the levels of the outer meeting edges of the said meniscus sections. The upper portion of the said casing is spaced from the outer side of the cylinder, and its upper opening is covered with a foraminous material. An air mixing chamber is arranged above the casing and is provided with a flat top which in turn is provided with peripheral openings.

Figure 2:
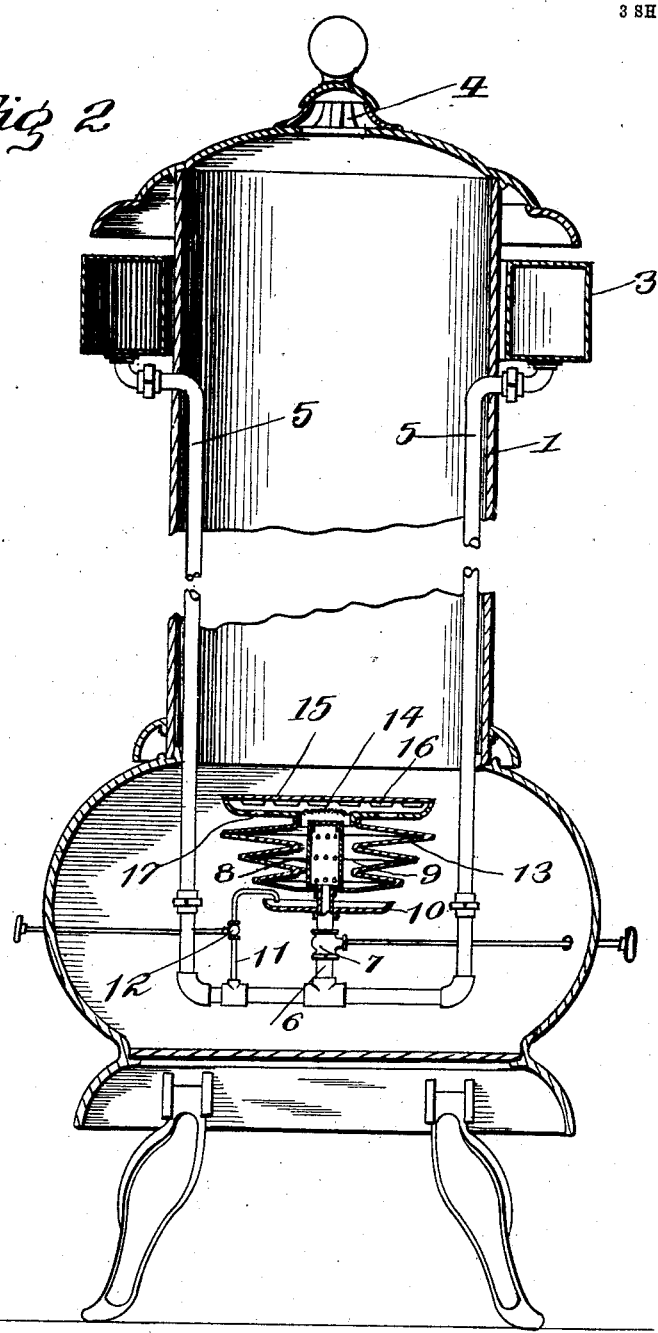
Figure 3:
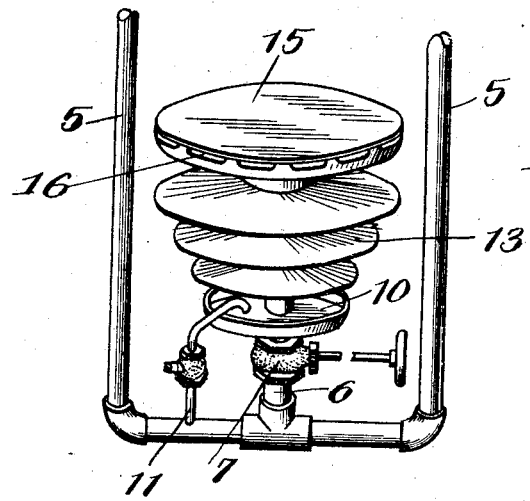
Figure 4:
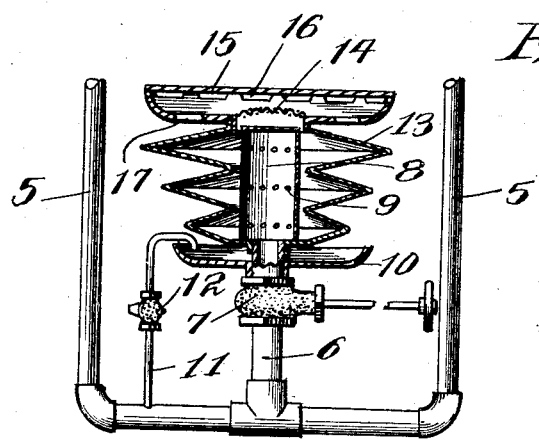

In the accompanying drawings:—Figure 1, is a perspective view of the heater. Fig. 2, is a vertical sectional view of the same. Fig. 3, is a perspective view of the burner detached, and: Fig. 4, is a vertical sectional view of the burner detached.

The heater comprises the drum 1, which is separably mounted upon the base 2. The drum is surrounded by the fuel reservoir 3. The top of the drum is provided with the draft escape 4. The fuel supply pipes 5, 5, connect at their upper ends with the fuel tank 3, and pass down along the inside of the drum and enter the base 2. Within the base 2, the said fuel supply pipes 5, 5, come together and join with the vertical pipe 6, which is provided with a needle valve 7. The cylinder 8 is mounted upon the upper end of the pipe 6, and is provided with a number of perforations 9, arranged in horizontal rows. The upper end of the said cylinder is closed. The starting pan 10 is located upon the pipe 6, below the cylinder 8, and the pipe 11 connects at its lower end with one of the pipes 5, and terminates at its upper end above the pan 10. Said pipe 11 is provided with a needle valve 12. The casing 13 surrounds the cylinder 8, and the top thereof is provided with a central outlet opening. Said casing is composed of a number of meniscus sections joined together at their edges. Said sections increasing in diameter from the lower to the upper, and having their inner edges in vertical alinement, and their outer edges in oblique alinement. The rows of perforations 9 are located in the same horizontal level as the outer meeting edges of the said meniscus sections. The flat topped mixing chamber 15 is located on top of the chamber 13, the bottom of said mixing chamber being provided with a collar fitting in the outlet opening of casing 13, said mixing chamber resting on said casing. The foraminous screen 14 is located within the collar of the mixing chamber 15 and extends above the outlet opening of chamber 13. Said mixing chamber 15 is provided with peripheral flame openings 16 and air admission openings 17.

From the foregoing description it is obvious that when the denatured alcohol is led from the tank 3, down through the pipes 5, 5, and up through the pipe 11 into the starting pan 10, and is ignited in the said pan, the heat from the flame will envelop the casing 13, and will also enter the drum 1. This gasifies the fuel in the said pipes 5, 5, and the tank 3, and when sufficiently gasified the valve 12 is closed and the valve 7 is opened. The fuel gas will then pass up into the cylinder 8 and spray through the perforations 9 into the corners formed by the outer meeting edges of the meniscus sections of the casing. Thus by being brought into direct contact with the hot metal, the particles of fuel become highly gasified and pass through the foraminous material 14, and enter the mixing chamber 15. In the said chamber the fuel gas is mixed with air which is admitted through the perforations 17, and the resultant mixture passes out through the peripheral perforations 16, where the mixture is ignited. Thus the process of gasification is carried on by the main burner after the parts have become sufficiently hot.

Having described my invention, what I claim as new and desire to secure by Letters Patent is:—

1. A heater of the character described comprising a vaporizing chamber formed of meniscus sections joined at their edges, a perforated cylindrical member located within said vaporizing chamber and resting on the bottom thereof, means for supplying hydrocarbon to said member, and a mixing chamber resting on the top of said vaporizing chamber and communicating therewith, said mixing chamber being provided with peripheral flame outlets.

2. A heater of the character described comprising a perforated cylindrical member, means for supplying hydrocarbon thereto, a vaporizing chamber comprising a casing inclosing said member and formed of meniscus sections joined at their edges, the inner edges of said sections being vertically alined and their outer edges obliquely alined, and a burner resting upon the top section of said casing and having a mixing chamber communicating with the interior of said casing.

3. A heater of the character described comprising a vaporizing chamber formed of meniscus sections joined at their edges, a perforated cylindrical member located within said vaporizing chamber and resting on the bottom thereof, means for supplying hydrocarbon to said member, a mixing chamber resting on the top of said vaporizing chamber and communicating therewith, said mixing chamber being provided with peripheral flame outlets, and a foraminous screen extending across the passage between said vaporizing and mixing chambers.

4. A heater of the character described comprising a vaporizing chamber having interior annular vaporizing pockets, a perforated cylindrical member located within said vaporizing chamber and resting on the bottom thereof, means for supplying hydrocarbon to said member, and a mixing chamber resting on the top of said vaporizing chamber and communicating therewith, said mixing chamber being provided with flame outlets.

5. A heater of the character described comprising a vaporizing chamber having interior annular vaporizing pockets and an upper outlet opening, a perforated cylindrical member located within said vaporizing chamber and resting on the bottom thereof, means for supplying hydrocarbon to said member, and a mixing chamber provided with a collar fitting within said outlet opening, said mixing chamber being provided with flame outlets.

6. A heater of the character described comprising a vaporizing chamber formed of meniscus sections joined at their edges, said casing being provided with an outlet opening in its upper end, a perforated cylindrical member located within said vaporizing chamber and resting on the bottom thereof, means for supplying hydrocarbon to said member, and a mixing chamber provided with a collar fitting within said outlet opening, said mixing chamber being also provided with peripheral outlet openings.

7. A heater of the character described comprising a perforated cylindrical member, means for supplying hydrocarbon thereto, a vaporizing chamber comprising a casing inclosing said member and formed of meniscus sections joined at their edges, the inner edges of said sections being vertically alined and their outer edges obliquely alined, a burner resting upon the top section of said casing and having a mixing chamber communicating with the interior of said casing, and a starting pan located beneath said member and said casing.

8. A heater of the character described comprising a cylindrical member provided with outlet perforations, means for feeding hydrocarbon to the interior of said member, a vaporizing chamber formed of a casing surrounding said member and having an interior surface provided with depressions, the perforations in said member being opposite the depressions in the interior surface of the casing, and a burner supported by the top wall of said casing and communicating with the interior of the latter.

9. A heater of the character described comprising a cylindrical member provided with perforations, means for feeding hydrocarbon to the interior of said member, a vaporizing chamber formed of a casing surrounding said member and provided with horizontally extended recesses, said perforations and recesses being arranged opposite each other, and a burner supported by the top wall of said casing and communicating with the interior of the latter.

10. In a heater of the character indicated, a burner comprising a member having perforations arranged in horizontal rows, a casing surrounding said member and having meniscus sections joined together at their edges, said perforations being in horizontal alinement with the outer meeting edges of said sections, and a mixing chamber arranged above said casing.

11. In a heater of the character indicated, a burner comprising a member having perforations arranged in horizontal rows, a casing surrounding said member and having meniscus sections joined together at their edges and which increase in diameter from the lower to the upper, said perforations being in horizontal alinement with the outer meeting edges of said sections and a mixing chamber arranged above said casing.

12. In a heater of the character indicated, a burner comprising a member having perforations arranged in horizontal rows, a casing surrounding said member and having meniscus sections joined together at their edges, the inner edges of said sections being vertically alined and the outer edges of said sections being alined obliquely, said perforations being in horizontal alinement with the outer meeting edges of said sections and a mixing chamber arranged above said casing.

13. A heater of the character described comprising a base, a drum supported thereby, a fuel reservoir, a plurality of vertically disposed pipes leading therefrom and passed down inside said drum, a circular burner housed in said base and uniting the lower ends of said pipes, said burners being provided with peripheral openings arranged to direct the flame against said pipes, and means for regulating the flow of fuel to said burner.

In testimony whereof I have signed my name to this specification in the presence of two subscribing witnesses.

GEORGE G. SCHROEDER.

Witnesses:
BERLIN G. GRAMS,
C. L. MILLARD.